US009747853B2

(12) United States Patent
Lee et al.

(10) Patent No.: US 9,747,853 B2
(45) Date of Patent: Aug. 29, 2017

(54) LIQUID CRYSTAL DISPLAY

(71) Applicant: Samsung Display Co., Ltd., Yongin (KR)

(72) Inventors: Hyoung-Rae Lee, Asan-si (KR); Choong-Hwa Kim, Seongnam-si (KR); Moon Ju Kim, Asan-si (KR); Eun Suk Kim, Asan-si (KR); Seok-Kun Yoon, Seoul (KR); Kwang Youl Lee, Asan-si (KR); Jong-Won Choo, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 126 days.

(21) Appl. No.: 14/639,958

(22) Filed: Mar. 5, 2015

(65) Prior Publication Data
US 2016/0055813 A1 Feb. 25, 2016

(30) Foreign Application Priority Data

Aug. 21, 2014 (KR) ........................ 10-2014-0109108

(51) Int. Cl.
*G09G 5/00* (2006.01)
*G09G 3/36* (2006.01)
*G02F 1/1362* (2006.01)

(52) U.S. Cl.
CPC ..... *G09G 3/3655* (2013.01); *G02F 1/136286* (2013.01); *G09G 3/3696* (2013.01); *G09G 2330/025* (2013.01); *G09G 2330/04* (2013.01); *G09G 2330/06* (2013.01)

(58) Field of Classification Search
CPC .............. G09G 3/3655; G09G 3/3696; G09G 2330/06; G09G 2330/04; G09G 2300/0814; G02F 1/136286
USPC ........................................................ 345/691
See application file for complete search history.

(56) References Cited

U.S. PATENT DOCUMENTS

| 2002/0057392 A1* | 5/2002 | Ha ..................... G02F 1/136204 349/40 |
| 2006/0119757 A1* | 6/2006 | Tsao .................. G02F 1/136204 349/40 |
| 2006/0139553 A1* | 6/2006 | Kang .................. G02F 1/13454 349/149 |
| 2008/0043162 A1* | 2/2008 | Tung ................. G02F 1/136204 349/40 |

(Continued)

FOREIGN PATENT DOCUMENTS

| KR | 10-0218504 | 9/1999 |
| KR | 10-2008-0059688 | 6/2008 |
| KR | 10-0866952 | 11/2008 |

*Primary Examiner* — Adam R Giesy
*Assistant Examiner* — Chineyere Wills-Burns
(74) *Attorney, Agent, or Firm* — H.C. Park & Associates, PLC

(57) ABSTRACT

A liquid crystal display according to an exemplary embodiment of the present disclosure includes: a first substrate where a pixel electrode is formed; a second substrate facing the first substrate; a liquid crystal layer provided between the first substrate and the second substrate; and a driving device connected with the first substrate, wherein the first substrate includes a pixel area where pixels emit light, and a load storage area provided between the pixel area and the driving device and constantly maintaining a load applied to the pixels in the pixel area.

19 Claims, 7 Drawing Sheets

(56) References Cited

U.S. PATENT DOCUMENTS

| | | | |
|---|---|---|---|
| 2009/0091673 A1 | 4/2009 | Chen et al. | |
| 2009/0262094 A1 | 10/2009 | Lin | |
| 2014/0139792 A1* | 5/2014 | Zhu | G02F 1/1345 349/106 |
| 2014/0185169 A1* | 7/2014 | Jung | G02F 1/136204 361/56 |

* cited by examiner

LIQUID CRYSTAL DISPLAY

CROSS-REFERENCE TO RELATED APPLICATION

This application claims priority from and the benefit of Korean Patent Application No. 10-2014-0109108 filed on Aug. 21, 2014, which is hereby incorporated by reference for all purposes as if fully set forth herein.

BACKGROUND

Field

Exemplary embodiments relate to a liquid crystal display.

Discussion of the Background

Flat panel display devices which are presently known include a liquid crystal display (LCD), a plasma display panel (PDP), an organic light emitting display (OLED) device, a field effect display (FED), an electrophoretic display device, and the like.

Particularly, the liquid crystal display is one of flat panel display devices which are currently most widely used, and includes two substrates of display panel in which field generating electrodes such as a pixel electrode and a common electrode are formed, and a liquid crystal layer interposed therebetween.

The liquid crystal display displays an image by applying a voltage to the field generating electrodes to generate an electric field in the liquid crystal layer, thereby determining an orientation of liquid crystal molecules of the liquid crystal layer based on the generated electric field and controlling polarization of incident light.

The liquid crystal display has an active matrix structure formed of data lines and gate lines that correspond to a resolution. A data signal and a gate signal are output in time for a light emission period during which pixels emit light, and the data signal is output and the gate signal is not output for a blank period during which pixels do not emit light, so it does not apply a load to the pixels corresponding to the data signal during the blank period. The data lines are directly connected with a driver IC on a lower substrate of display panel and transmit the data signals, and a common voltage Vcom can be applied to an upper substrate of display panel through an OP AMP.

In the blank period, the driver IC outputs black data signal but does not output the gate signal so that capacitors of the pixels cannot be charged, that is, a load free state occurs. When entering the light emission period, the gate signal is output and accordingly the data signal is output so that a transient load is generated. In this case, an output voltage of a DC/DC converter is dropped due to an unexpected current. When a power voltage AVDD derived from the output voltage of the DC/DC converter and a first gamma voltage Vgamma1 are reversed, an internal circuit of the driver IC is damaged, and accordingly, the power voltage AVDD and the first gamma voltage Vgamma1 should have a predetermined difference. That is, the first gamma voltage is lower than the power voltage AVDD, and accordingly luminance is decreased.

In addition, a transient current should be supplied corresponding to the transient load according to the entering of the light emission period in the DC/DC converter that supplies a current. Although capacity of the AMP should be increased according to performance of the transient load, it is difficult to manufacture an AMP having tolerance to a peak current stress.

Meanwhile, since the electrostatic discharge (ESD) applied to the upper substrate of display panel and thus flows into the liquid crystal display does not include an additional discharging path, electric shock is given to the OP AMP through the common electrode and the electric shock is also applied to the driver IC through data lines from the common electrode.

The above information disclosed in this Background section is only for enhancement of understanding of the background of the disclosure and therefore it may contain information that does not form the prior art that is already known in this country to a person of ordinary skill in the art.

SUMMARY

Exemplary embodiments provide a liquid crystal display that can minimize variation in a transient load and assure an electrostatic discharging path.

Additional aspects will be set forth in the detailed description which follows, and, in part, will be apparent from the disclosure, or may be learned by practice of the inventive concept.

A liquid crystal display according to an exemplary embodiment of the present disclosure includes: a first substrate including a pixel electrode; a second substrate facing the first substrate; a liquid crystal layer provided between the substrates; and a driving device coupled with the first substrate, wherein the first substrate includes a pixel area where pixels emit light and a load storage area provided between the pixel area and the driving device and constantly maintaining a load applied to the pixels in the pixel area.

In the load storage area, at least one load switching transistor that is turned off for a light emission period during which the pixels emit light and turned on for a blank period during which the pixels do not emit light may be formed.

The load switching transistor may include a load gate electrode, a load source electrode, and a load drain electrode, and the load gate electrode may be a part of a blank gate line transmitting a blank gate signal that turns on the load switching transistor during the blank period.

A driving ground line of the driving device transmitting a ground voltage may be connected with a ground line formed in the load storage area.

A discharge capacitor including a first discharge capacitor electrode which is a part of the ground line and a second discharge capacitor electrode overlapping the first discharge capacitor electrode may be further formed in the load storage area.

The common electrode may be formed through the whole surface of the second substrate and overlap the ground line, and the second discharge capacitor electrode may be a part of the load drain electrode.

A liquid crystal display according to another exemplary embodiment of the present disclosure includes: a pixel area including a plurality of gate/data lines, and a plurality of pixels connected to the gate/data lines; and a load storage area formed adjacent to the pixel area including a blank gate line and a plurality of load pixels connected to the blank gate line and the date lines; wherein the each load pixel includes a load switching transistor connected to the blank gate line and data line, a load pixel capacitor and a discharge capacitor connected thereto.

The load storage area may further include a ground line transmitting a ground voltage and extended along the load storage area.

The ground line may overlap all the load switching transistors in the load storage area.

A blank gate signal applied through the blank gate line may turn off the load switching transistor during a light emission period and may turn on the load switching transistor during a blank period.

The load pixel capacitor of the load pixel may be charged by the turn-on the load switching transistor during a blank period to constantly maintain the load to reduce transient loads generated upon entering a light emission period and to prevent transient drops of a power voltage.

The blank gate line and the ground line may be substantially extended along a first direction.

The blank gate line may include a load gate electrode of the load switching transistor.

The discharge capacitor may include a first discharge capacitor electrode which is a part of the ground line and a second discharge capacitor electrode overlapping the first discharge capacitor electrode.

The ground line may include the first discharge capacitor electrode.

The second discharge capacitor electrode may be a part of a load drain electrode of the load switching transistor.

The second discharge capacitor electrode may be a part of a load drain electrode of the load switching transistor.

According to the present disclosure, the capacitor of the pixel is charged by the load switching transistor turned on during the blank period so that a load can be constantly maintained, and thus a transient load generated when entering the light emission period can be reduced so that a transient drop of a power voltage AVDD can be prevented and accordingly the first gamma voltage Vgamma1 can be increased, thereby improving luminance.

In addition, the present disclosure provides an additional discharging path by overlapping the discharge capacitor connected to the ground line with the common electrode. Such additional discharging path prevents electric shocks caused by the electrostatic discharge from the common electrode and protect the OP AMP or the driver IC.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE EMBODIMENTS

Figure 1:
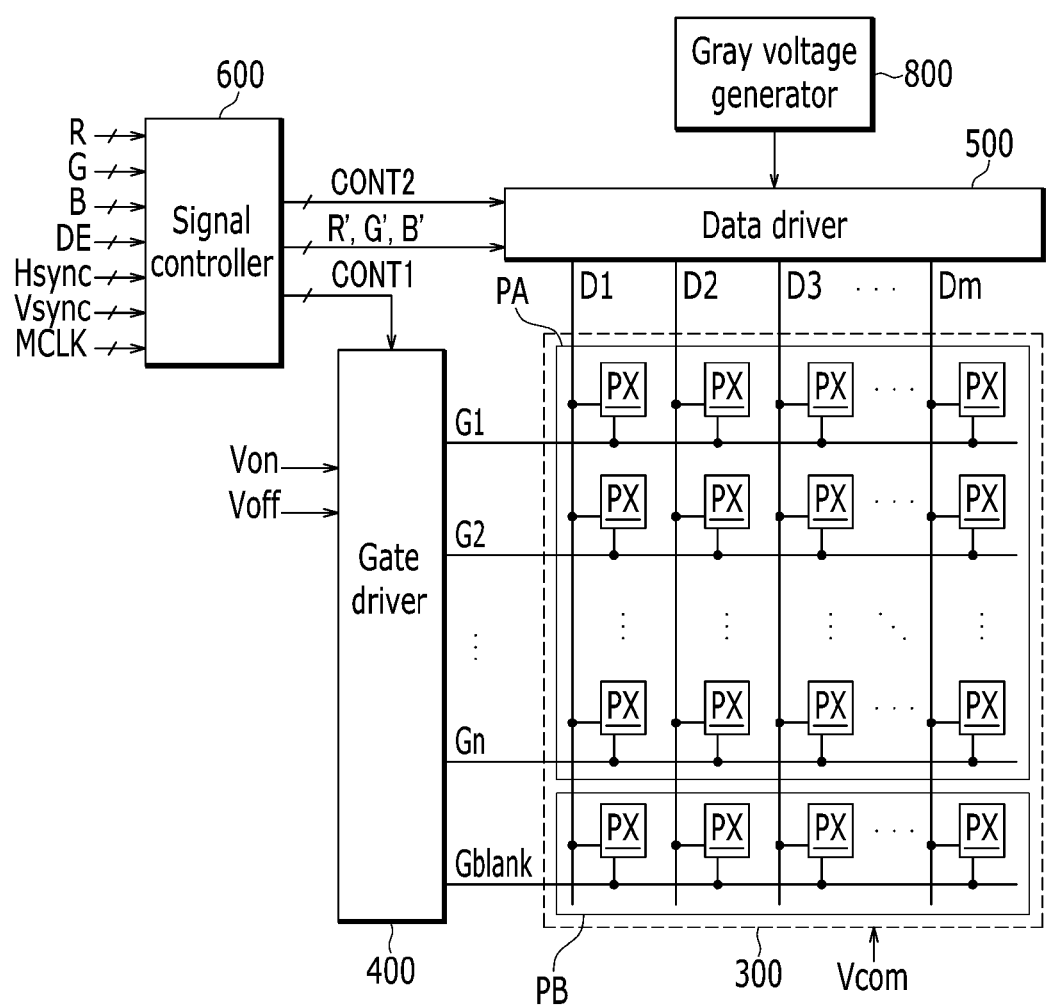
FIG. 1 is a block diagram of a liquid crystal display according to an exemplary embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
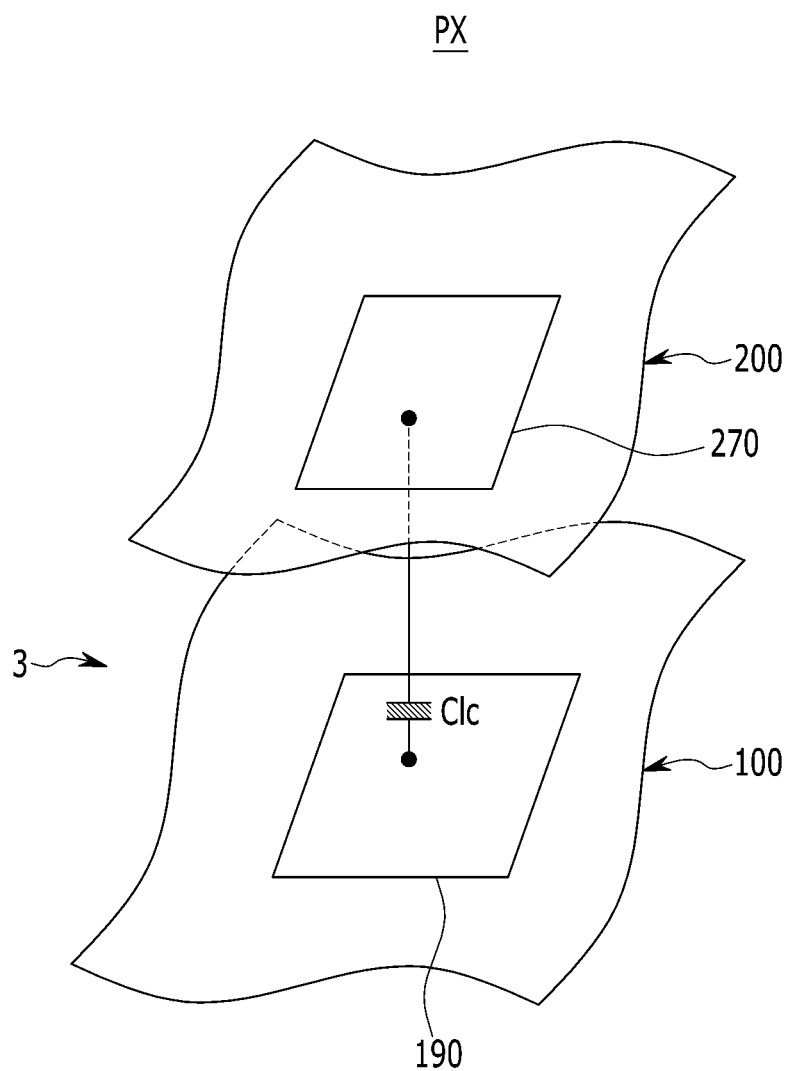
FIG. 2 is a schematic diagram of one pixel in a pixel area of the liquid crystal display according to the exemplary embodiment of the present disclosure.

FIG. 1 is a block diagram of a liquid crystal display according to an exemplary embodiment of the present disclosure and FIG. 2 is a schematic diagram of one pixel in a pixel area of the liquid crystal display according to the exemplary embodiment of the present disclosure.

In the exemplary embodiment, the liquid crystal display is exemplarily described as below, but all the exemplary embodiments of the present disclosure are applicable to not only the liquid crystal display but also to all flat panel displays such as a plasma display panel (PDP), an organic light emitting display (OLED), and the like.

As shown in FIG. 1, a liquid crystal display according to the exemplary embodiment of the present disclosure includes a display panel 300, a gate driver 400, a data driver 500, a gray voltage generator 800, and a signal controller 600.

Referring to FIG. 1, the display panel 300 includes a pixel area PA and a load storage area PB formed adjacent to the pixel area PA, and the pixel area PA includes a plurality of signal lines $G_1$ to $G_n$ and $D_1$ to $D_m$ and a plurality of pixels PX connected to the signal lines $G_1$ to $G_n$ and $D_1$ to $D_m$. The load storage area PB includes a blank gate line $G_{blank}$ and the date lines $D_1$ to $D_m$ and a plurality of load pixels PX' connected to the blank gate line $G_{blank}$ and the date lines $D_1$ to $D_m$.

In the view of a structure shown in FIG. 2, the display panel 300 includes first substrate 100 and a second substrate 200 facing each other, and a liquid crystal layer 3 provided between the first substrate 100 and the second substrate 200.

The signal lines $G_1$ to $G_n$ and $D_1$ to $D_m$ include a plurality of gate lines $G_1$ to $G_n$ transmitting a gate signal (hereinafter referred to as a scan signal) and a plurality of data lines $D_1$ to $D_m$ transmitting a data voltage. The gate lines $G_1$ to $G_n$ are substantially extended in a row direction and almost parallel with each other, and the data lines $D_1$ to $D_m$ are substantially extended in a column direction and almost parallel with each other.

Each pixel PX in the pixel area PA, for example, a pixel PX connected to an i-th (i=1, 2, . . . , n) gate line $G_i$ and a j-th (j=1, 2, . . . , m) data line $D_j$ includes a switching element connected to the signal lines $G_i$ and $D_j$, a liquid crystal capacitor Clc connected thereto, and a storage capacitor. The storage capacitor may be omitted as necessary.

The switching element is a three-terminal element such as a thin film transistor, which is provided in the first substrate, and a control terminal thereof is connected with the gate line $G_i$, an input terminal thereof is connected with the data line $D_j$, and an output terminal thereof is connected with the liquid crystal capacitor Clc and the storage capacitor.

The liquid crystal capacitor Clc includes a pixel electrode 190 of the first substrate 100 and a common electrode 270 of the second substrate 200 as two terminals, and the liquid crystal layer 3 between the two electrodes 190 and 270 functions as a dielectric material.

The pixel electrode 190 is connected with the switching element, and the common electrode 270 is formed through the whole surface of the upper substrate 200 and receives a common voltage Vcom. Unlike as shown in FIG. 2, the common electrode 270 may be provided in the lower substrate 100, and in this case, at least one of the two electrodes 190 and 270 may be formed in the shape of a line or a bar.

The storage capacitor is formed when a separate signal line (not shown) provided on the first substrate 100 and the pixel electrode 190 are overlapped with each other with an insulator therebetween, and a predetermined voltage such as a common voltage Vcom is applied to the separate signal line. However, the storage capacitor may be formed by the pixel electrode 190 and the overlaying previous gate line $G_{i-1}$ that are arranged to overlap each other via an insulator.

Meanwhile, in order to display color image, each pixel PX uniquely displays one of primary colors (spatial division) or alternately displays the primary colors with time (temporal division) to show a desired color by the spatial or temporal sum of the primary colors. An example of the primary colors may include three primary colors such as red, green, and blue.

The display panel 300 is provided with at least one polarizer (not shown).

Next, the liquid crystal display according to the exemplary embodiment of the present disclosure will be described in detail.

Referring back to FIG. 1, the gray voltage generator 800 generates all grayscale voltages or a limited number of grayscale voltages related to transmittance of the pixels PX. The grayscale voltage may include a positive value and a negative voltage with respect to the common voltage Vcom.

The gate driver 400 is connected to the gate lines $G_1$ to $G_n$ of the display panel 300 to thereby apply a gate signal including a combination of a gate-on voltage Von and a gate-off voltage Voff to the gate lines $G_1$ to $G_n$.

The data driver 500 is connected to the data lines $D_1$ to $D_m$ of the display panel 300, and selects a gray voltage from the gray voltage generator 800 and applies the selected gray voltage as a data voltage to the data lines $D_1$ to $D_m$. However, in the case where the gray voltage generator 800 does not provide all the gray voltages, but provides only a predetermined number of reference gray voltages, the data driver 500 generates desired data voltages Vdata by dividing the reference gray voltages.

The signal controller 600 controls the gate driver 400 and the data driver 500.

The driving devices 400, 500, 600, and 800 respectively including the gate driver 400, the data driver 500, the gray voltage generator 800, and the signal controller 600 may be directly mounted as at least one IC chip to the display panel 300, may be mounted as a Flexible Printed Circuit (FPC) film (not shown) and thus attached to the display panel 300 as a Tape Carrier Package (TCP), or may be mounted to a Printed Circuit Board (PCB) (not shown). Alternatively, the driving devices 400, 500, 600, and 800 may be integrated with the signal lines $G_1$ to $G_n$ and $D_1$ to $D_m$ and a thin film transistor switching element of the display panel 300. In addition, the driving devices 400, 500, 600, and 800 may all be integrated in a single chip, and in this case, at least one of the driving devices or at least one circuit element configuring the driving devices may be positioned outside the single chip.

Next, an operation of the display device will be described in detail.

The signal controller 600 receives input image signals R, G, and B and an input control signal controlling displaying of the input image signals from an external graphics controller (not shown). The input image signals R, G, and B contain luminance information about each pixel PX in the pixel area PA of the display panel 300, and the luminance has a predetermined number, for example, $1024=2^{10}$, $256=2^8$, or $64=2^6$, of grays. Examples of input control signals include a vertical synchronization signal Vsync, a horizontal synchronization signal Hsync, a main clock signal MCLK, a data enable signal DE, and the like.

The signal controller 600 appropriately processes the input image signals R, G, and B according to operating conditions of the display panel 300 based on the input control signal, generates a gate control signal CONT1 and a data control signal CONT2, transmits the gate control signal CONT1 to the gate driver 400, and the transmits the data control signal CONT2 and the processed image signals R', G', and B' to the data driver 500.

The gate control signal CONT1 includes a scan start signal STV that instructs start of scanning, and at least one clock signal that controls an output period of the gate-on voltage Von. The gate control signal CONT1 may further include an output enable signal OE that limits the duration of the gate-on voltage Von.

The data control signal CONT2 includes a horizontal synchronization start signal STH that indicates start of transmission of a digital image signal DAT with respect to pixels PX in one row, a load signal LOAD instructing application of an analog data voltage to the data lines $D_1$ to $D_m$, and a data clock signal HCLK. The data control signal CONT2 may further include an inversion signal RVS that inverts a polarity of a data voltage with respect to a common voltage Vcom. (hereinafter, a polarity of a data voltage with respect to a common voltage will be referred to as a polarity of a data voltage)

According to the data control signal CONT2 from the signal controller 600, the data driver 500 receives the image signals R', G', and B' with respect to pixels PX of one row in the pixel area PA, converts the image signals R', G', and B' to analog data voltages by selecting a gray voltage corresponding to the respective processed image signals R', G', and B', and then applies the analog data voltage to the corresponding data line $D_1$ to $D_m$.

The gate driver 400 applies the gate-on voltage Von to the gate lines $G_1$ to $G_n$ according to the gate controls signal CONT1 transmitted from the signal controller 600 to turn is on a switching element connected to the gate lines $G_1$ to $G_n$. Then, the data voltage applied to the data lines $D_1$ to $D_m$ is applied to the corresponding pixel PX in the pixel area PA through the turned-on switching element.

A difference between the data voltage applied to the pixel PX and the common voltage Vcom is expressed as a charge voltage of the liquid crystal capacitor Clc, that is, a pixel voltage. The arrangement of the liquid crystal molecules varies according to a magnitude of the pixel voltage, and as a result, changing polarization of light passing through the liquid crystal layer 3. The polarization change results in transmittance variations of light passing through the polarizer, which enables the pixels PX to display luminance represented by a gray scale of the image signal DAT.

The process is repeated by setting 1 horizontal period (referred to as "1H", and being the same as one period of a horizontal synchronizing signal Hsync and a data enable signal DE) by a unit, and as a result, the gate-on voltages Von are sequentially applied to all the gate lines $G_1$-$G_n$ and the data voltages are applied to all the pixels PX to display an image for one frame.

When one frame ends, the next frame starts, and a state of the inversion signal RVS applied to the data driver 500 is controlled so that the polarity of the data voltage applied to each pixel PX is opposite to the polarity in the previous frame ("frame inversion"). In this case, even in one frame, a polarity of the data voltage flowing through one data line changes periodically according to a characteristic of the inversion signal RVS (example: row inversion, dot inversion), or the polarities of the data voltages applied to one pixel row may be different from each other (example: column inversion, dot inversion).

Hereinafter, the structure of the liquid crystal display according to the exemplary embodiment of the present disclosure will be described in detail with reference to FIG. 3 to FIG. 7.

Figure 3:
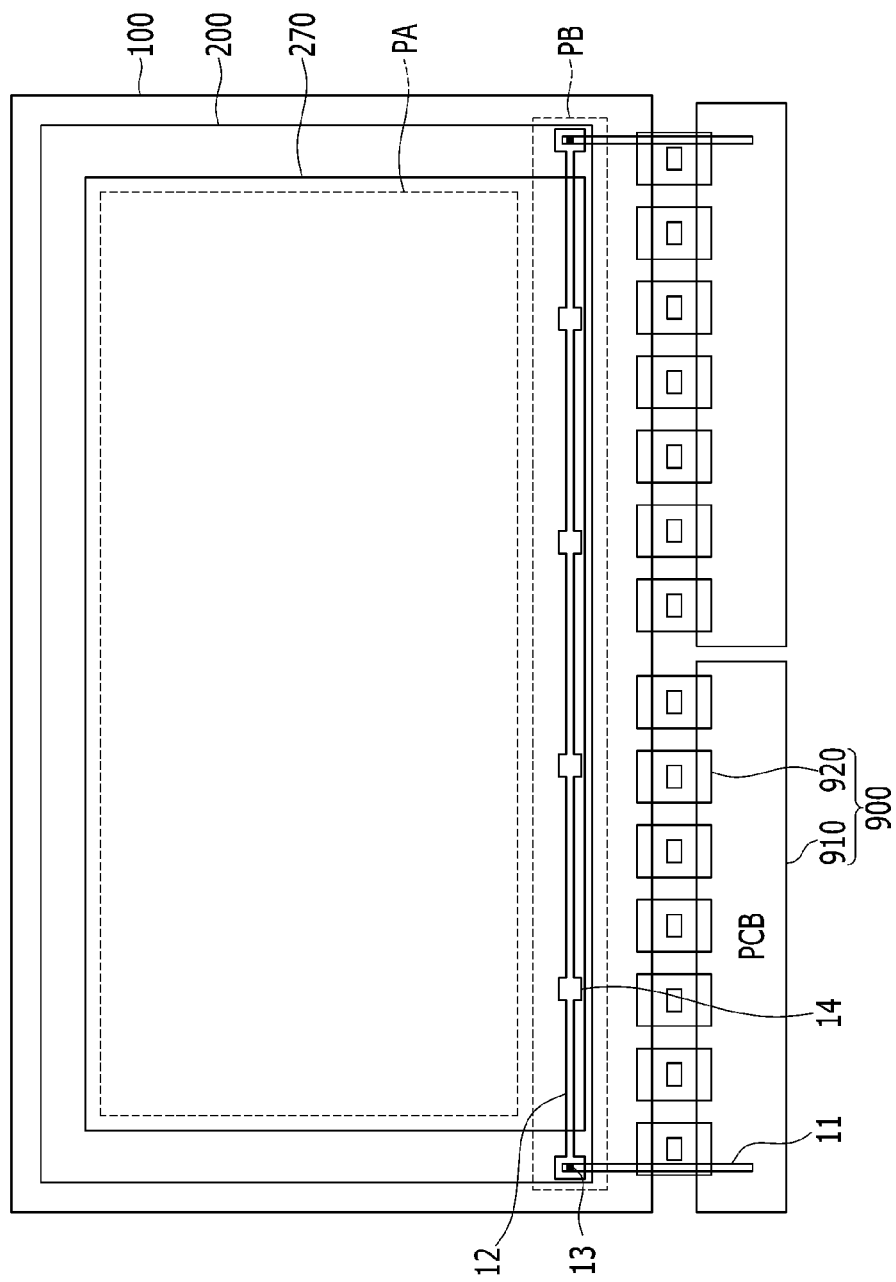
FIG. 3 is a top plan view of the liquid crystal display according to the exemplary embodiment of the present disclosure.
Figure 4:
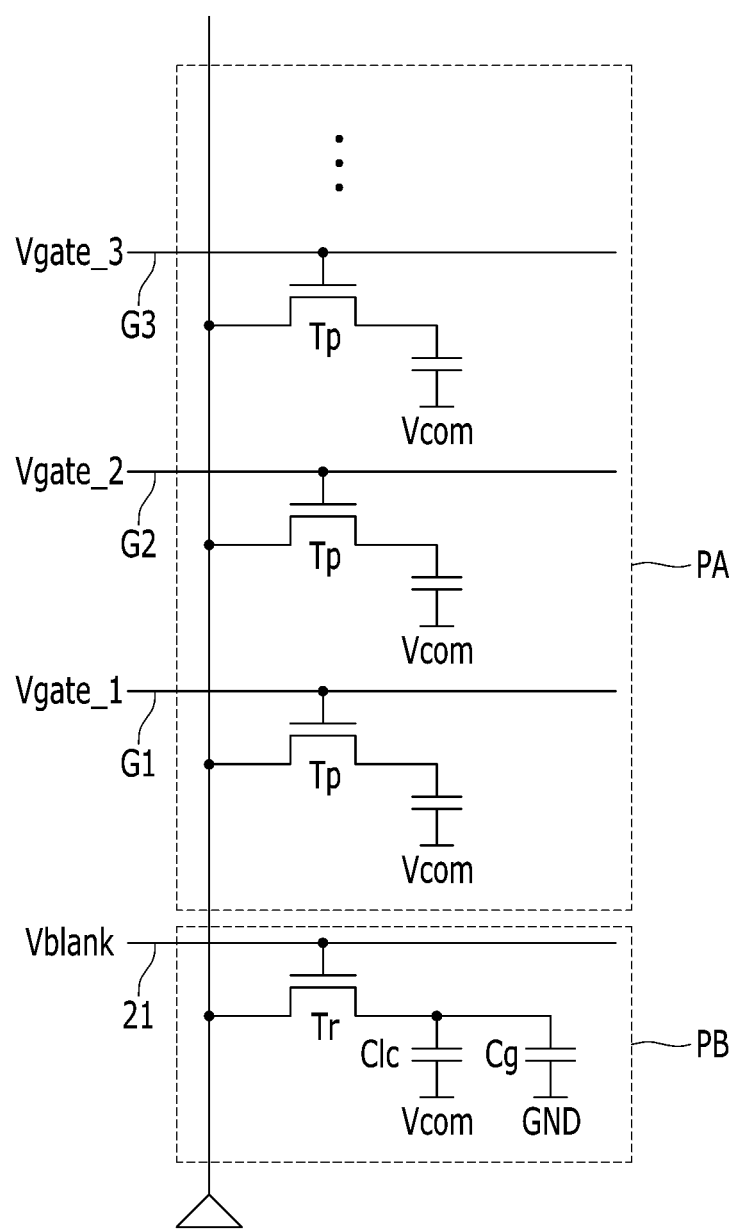
FIG. 4 is an equivalent circuit diagram of a part of pixels in the liquid crystal display according to the exemplary embodiment of the present disclosure.

FIG. 3 is a top plan view of the liquid crystal display according to the exemplary embodiment of the present disclosure, and FIG. 4 is an equivalent circuit diagram of a part of pixels of the liquid crystal display according to the exemplary embodiment of the present disclosure.

As shown in FIG. 3, the liquid crystal display according to the exemplary embodiment of the present disclosure includes a first substrate 100 as a thin film transistor array substrate, a second substrate 200 as a color filter substrate facing the first substrate 100 and may be including a common electrode 270 formed therein, a liquid crystal layer 3 (refer to FIG. 2) provided between the first substrate 100 and the second substrate 200, and a driving device 900 connected with the edge portion of the first substrate 100. The driving device 900 may include the gate driver 400, the data driver 500, the gray voltage generator 800, and the signal controller 600 as described above. The driving device 900 includes a printed circuit board (PCB) 910 delivering the input image signals R, G, and B, the vertical synchronization signal Vsync, the horizontal synchronizing signal Hsync, the main clock signal MCLK, and the data enable signal DE generated from an external graphics controller (not shown), and a tape carrier package (TCP) 920 in which an IC chip is mounted to a flexible printed circuit (FPC) film and connects the printed circuit board (PCB) 910 and the display panel. Such a TCP 920 may include the gate driver 400, the data driver 500, the gray voltage generator 800, and the signal controller 600.

The first substrate 100 includes a pixel area PA where pixels emit light, and a load storage area PB provided between the pixel area PA and the driving device 900 and maintaining a load applied to the pixels in the pixel area PA to be constant.

As shown in FIG. 4, a plurality of pixel switching transistors Tp are formed in the pixel area PA, and at least one load switching transistor Tr is formed in the load storage area PB. Each pixel switching transistor Tp is sequentially applied with a plurality of gate signals Vgate_1, Vgate_2, Vgate_3, . . . through the gate lines G1, G2, G3, . . . and the at least one load switching transistor Tr is applied with a blank gate signal Vblank through the blank gate line 21.

Figure 5:
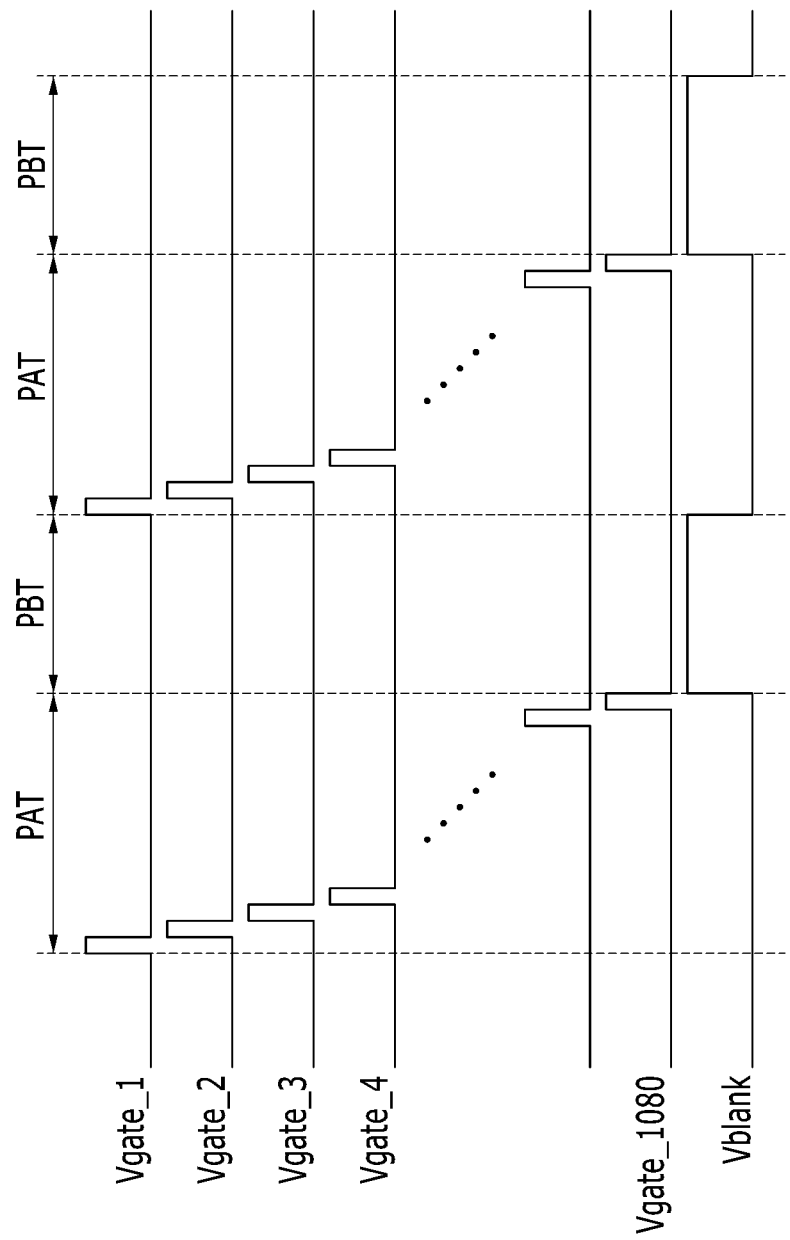
FIG. 5 is a timing diagram of the liquid crystal display according to the exemplary embodiment of the present disclosure.

FIG. 5 is a timing diagram of the liquid crystal display according to the exemplary embodiment of the present disclosure.

As shown in FIG. 5, the pixel switching transistors Tp are sequentially turned on by the gate signals Vgate_1 to Vgate 1080 applied through the gate lines during a light emission period PAT such that pixels emit light, and the pixel switching transistor Tp is turned off during a blank period PBT.

In addition, the blank gate signal Vblank applied through the blank gate line 21 turns off the load switching transistor Tr during the light emission period PAT and turns on the load switching transistor Tr during the blank period PBT.

As described, unlike the pixel switching transistor Tp, the load switching transistor Tr is turned off for the light emission period PAT during which the pixels emit light and is turned on for the blank period during which the pixels do not emit light. Thus, capacitors of the load pixels are charged by the turn-on load switching transistor Tr during the blank period PBT to constantly maintain the load to reduce transient loads generated upon entering the light emission period and to prevent transient drops of a power voltage AVDD.

In addition, by preventing the transient drops of the power voltage AVDD, a first gamma voltage Vgamma1 having a difference of 0.5 V to 1.0 V with the power voltage AVDD can be increased to improve luminance.

The following Table 1 discloses the improvement of luminance according to the power voltage AVDD. As shown in the table 1, when the power voltage AVDD increases by 1V, the luminance increases by 2.7% from 477nit to 490nit

TABLE 1

| AVDD | 0 G luminance | 255 G luminance | luminance increase |
|---|---|---|---|
| 15 V | 0.13 nit | 477 nit | 100.0% |
| 15.5 V | 0.13 nit | 485.3 nit | 101.7% |
| 16 V | 0.13 nit | 490 nit | 102.7% |

Meanwhile, a capacitor Clc formed by overlapping the common electrode 270 of FIG. 2 to which the common voltage Vcom is applied and the pixel electrode 190 of FIG. 2 is formed in the pixel area PA, and a discharge capacitor Cg forming a discharge path of electrostatic discharge and the load pixel capacitor Clc are formed in the load storage area PB.

Hereinafter, the discharge capacitor Cg will be described in detail with reference to FIG. 3 FIG. 4, FIG. 6, and FIG. 7.

Figure 6:
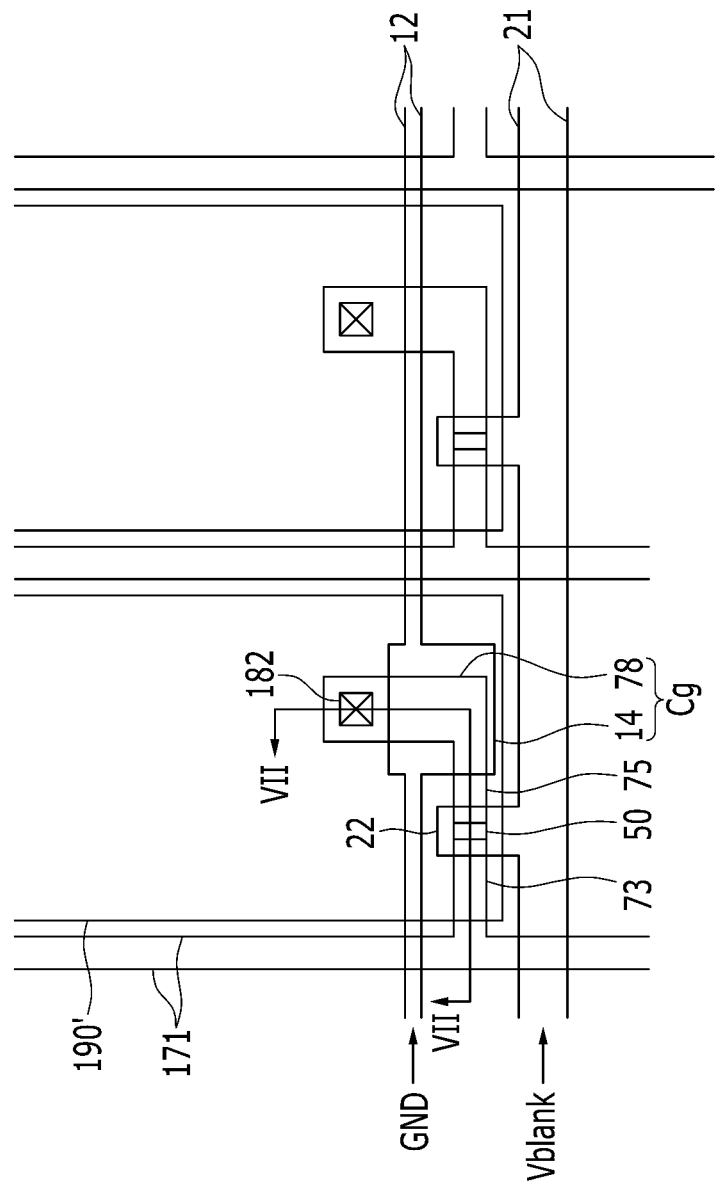
FIG. 6 is a detailed layout view of a part of load pixels in the load storage area of the liquid crystal display according to the exemplary embodiment of the present disclosure.
Figure 7:
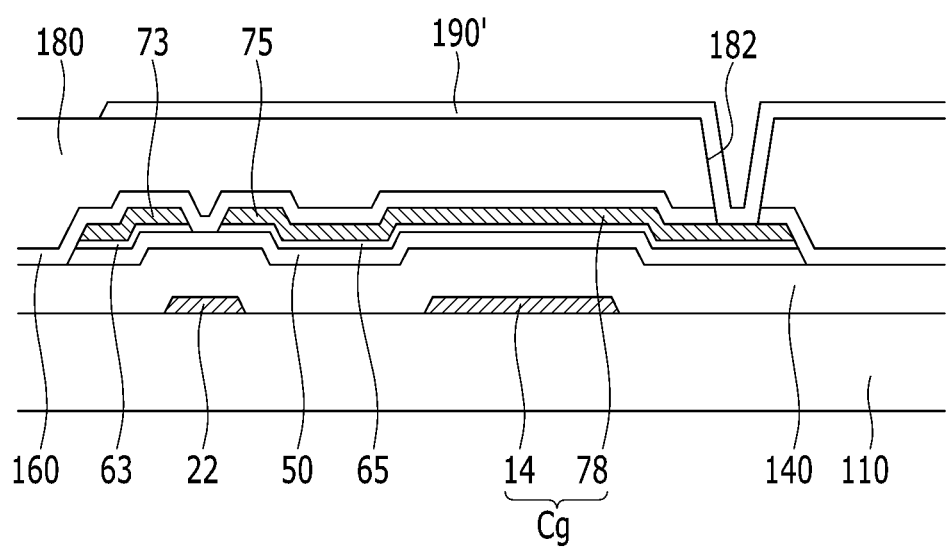
FIG. 7 is a cross-sectional view of FIG. 6, taken along the line VII-VII.

FIG. 6 is a detailed layout view of a part of the load pixels in the load storage area of the liquid crystal display according to the exemplary embodiment of the present disclosure, and FIG. 7 is a cross-sectional view of FIG. 6, taken along the line VII-VII.

Referring to FIG. 4, the load pixel in the load storage area PB includes the load switching transistor Tr connected to the blank gate line 21 and data line, the load pixel capacitor Clc and the discharge capacitor Cg connected thereto.

As shown in FIG. 3, a driving ground line 11 transmitting a ground voltage GND is extended to the first substrate 100 from the printed circuit board PCB 910 through the TCP 920. Such a driving ground line 11 is connected with a ground line 12 formed in the load storage area PB of the first substrate 100 through a contact hole 13.

The ground line 12 is extended along the load storage area PB and therefore it overlaps all the load switching transistors Tr formed in the load storage area PB.

As shown in FIG. 6 and FIG. 7, a blank gate line 21 and the ground line 12 are formed on an insulation substrate 110 in the load storage area PB of the liquid crystal display according to the exemplary embodiment of the present disclosure. The blank gate line 21 and the ground line 12 are substantially extended along a horizontal direction, and the blank gate line 21 transmits the blank gate signal Vblank and the ground line 12 transmits the ground voltage GND. The blank gate line 21 includes a load gate electrode 22 that protrudes upward, and the ground line 12 includes a first discharge capacitor electrode 14 extended by being protruded upward and downward.

A gate insulating layer 140 is formed on the blank gate line 21 and the ground line 12.

A load semiconductor 50 that may be made of amorphous silicon or crystalline silicon is formed on the gate insulating layer 140. Pair of ohmic contacts 63 and 65 are formed on the load semiconductor 50, and a data line 171 and a load drain electrode 75 are formed on the ohmic contacts 63 and 65.

The data line 171 transmits a data signal and crosses the blank gate line 21 and the ground line 12 by substantially extending in a vertical direction. The data line 171 includes a load source electrode 73 extended toward the load gate electrode 22, and the load drain electrode 75 includes a second discharge capacitor electrode 78 that overlaps the first discharge capacitor electrode 14.

The load switching transistor Tr includes the load gate electrode 22, the load source electrode 73, the load drain electrode 75, and the load semiconductor 50, and a channel of the load switching transistor Tr is formed in the load semiconductor 50 between the load source electrode 73 and the load drain electrode 75.

An interlayer insulating layer 160, which may be made of an inorganic insulation material, such as silicon nitride or silicon oxide, is formed on the data line 171, the load drain electrode 75, and an exposed portion of the load semiconductor 50.

A planarization layer 180, which may be made of an organic insulation material, is formed on the interlayer insulating layer 160, and a contact hole 182 that partially exposes the load drain electrode 75 is formed in the interlayer insulating layer 160 and the planarization layer 180.

The load pixel electrode 190' is formed on the planarization layer 180, and the load pixel electrode 190' is connected with the load drain electrode 75 through the contact hole 182.

The load pixel electrode 190', the common electrode 270 of FIG. 2, and the liquid crystal layer 3 of FIG. 2 provided between the load pixel electrode 190' and the common electrode 270 form the pixel capacitor Clc of FIG. 4, and the second discharge capacitor electrode 78, the first discharge capacitor electrode 14, and the gate insulating layer 140 provided between the second discharge capacitor electrode 14 and the first discharge capacitor electrode 14 form the discharge capacitor Cg of FIG. 4.

Since the common electrode 270 overlaps the first discharge capacitor electrode 14 of the ground line 12, when electrostatic discharge is applied to the common electrode 270 of the upper substrate, the electrostatic discharge is primarily discharged through the pixel capacitor Clc and the secondarily discharged through the discharge capacitor Cg, which is connected with the load pixel electrode 190'.

Accordingly, the common electrode 270 is discharged through an additional discharge path so that electric shock to an OP AMP or a driver IC due to the electrostatic discharge can be prevented in advance.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display comprising:
   a first substrate including a pixel electrode;
   a second substrate facing the first substrate;
   a liquid crystal layer provided between the first substrate and the second substrate; and
   a driving device coupled with the first substrate,
   wherein the first substrate comprises a pixel area where pixels emit light, and a load storage area provided between the pixel area and the driving device, the load storage area includes at least one load pixel having a load pixel electrode and constantly maintains a load applied to the pixels in the pixel area.

2. The liquid crystal display of claim 1, wherein the load pixel further includes a load switching transistor that is turned off for a light emission period during which the pixels emit light and turned on for a blank period during which the pixels do not emit light.

3. The liquid crystal display of claim 2, wherein the load switching transistor comprises a load gate electrode, a load source electrode, and a load drain electrode, and
   the load gate electrode is a part of a blank gate line transmitting a blank gate signal that turns on the load switching transistor during the blank period.

4. The liquid crystal display of claim 3, wherein a driving ground line of the driving device transmitting a ground voltage is connected with a ground line formed in the load storage area.

5. The liquid crystal display of claim 4, wherein a discharge capacitor including a first discharge capacitor electrode which is a part of the ground line and a second discharge capacitor electrode overlapping the first discharge capacitor electrode are further formed in the load storage area.

6. The liquid crystal display of claim 5, wherein the second discharge capacitor electrode is a part of the load drain electrode.

7. The liquid crystal display of claim 1, wherein a common electrode is formed through the whole surface of the second substrate.

8. The liquid crystal display of claim 7, wherein the common electrode overlaps a ground line formed in the load storage area.

9. A liquid crystal display, comprising:
   a pixel area including a plurality of gate/data lines, and a plurality of pixels connected to the gate/data lines; and
   a load storage area formed adjacent to the pixel area including a blank gate line and a plurality of load pixels connected to the blank gate line and the date lines;
   wherein the each load pixel includes a load switching transistor connected to the blank gate line and data line, a load pixel capacitor, a discharge capacitor, and a load pixel electrode connected to the load switching transistor.

10. The liquid crystal display of claim 9, wherein the load storage area further including a ground line transmitting a ground voltage and extended along the load storage area.

11. The liquid crystal display of claim 10, wherein the ground line overlaps all the load switching transistors in the load storage area.

12. The liquid crystal display of claim 10, wherein the blank gate line and the ground line are substantially extended along a first direction.

13. The liquid crystal display of claim 10, wherein the discharge capacitor includes a first discharge capacitor electrode which is a part of the ground line and a second discharge capacitor electrode overlapping the first discharge capacitor electrode.

14. The liquid crystal display of claim 13, wherein the ground line includes the first discharge capacitor electrode.

15. The liquid crystal display of claim 13, wherein the second discharge capacitor electrode is a part of a load drain electrode of the load switching transistor.

16. The liquid crystal display of claim 13, wherein the second discharge capacitor electrode is a part of a load drain electrode of the load switching transistor.

17. The liquid crystal display of claim 9, wherein a blank gate signal applied through the blank gate line turns off the load switching transistor during a light emission period and turns on the load switching transistor during a blank period.

18. The liquid crystal display of claim 9, wherein the load pixel capacitor of the load pixel is charged by the turn-on the load switching transistor during a blank period to constantly maintain the load to reduce transient loads generated upon entering a light emission period and to prevent transient drops of a power voltage.

19. The liquid crystal display of claim 9, wherein the blank gate line includes a load gate electrode of the load switching transistor.

* * * * *